United States Patent
Raftery

(10) Patent No.: US 8,199,927 B1
(45) Date of Patent: Jun. 12, 2012

(54) CONFERENCING SYSTEM IMPLEMENTING ECHO CANCELLATION AND PUSH-TO-TALK MICROPHONE DETECTION USING TWO-STAGE FREQUENCY FILTER

(75) Inventor: Emmet Raftery, London (CA)

(73) Assignee: ClearOnce Communications, Inc., Salt Lake City, UT (US)

(*) Notice: Subject to any disclaimer, the term of this patent is extended or adjusted under 35 U.S.C. 154(b) by 1158 days.

(21) Appl. No.: 11/933,366

(22) Filed: Oct. 31, 2007

(51) Int. Cl.
*H04B 15/02* (2006.01)
*H04B 3/20* (2006.01)
*H04M 9/08* (2006.01)
*H04B 15/00* (2006.01)
*H04R 27/00* (2006.01)
*H04M 9/00* (2006.01)

(52) U.S. Cl. .......... 381/94.1; 381/83; 381/94.5; 381/93; 379/406.08; 379/406.01; 379/406.03; 370/286; 704/233

(58) Field of Classification Search ............... 381/71.11, 381/71.8, 71.14, 83, 94.1, 94.8, 94.9, 94.5, 381/93; 379/406.01, 406.03–406.06, 406.8; 370/286–290; 704/233, 231
See application file for complete search history.

(56) References Cited

U.S. PATENT DOCUMENTS

| | | | |
|---|---|---|---|
| 4,591,670 A | 5/1986 | Itoh | |
| 4,609,787 A | 9/1986 | Horna | |
| 4,670,903 A | 6/1987 | Araseko et al. | |
| 4,827,472 A | 5/1989 | Ferrieu | |
| 4,894,820 A | 1/1990 | Miyamoto et al. | |
| 4,956,838 A | 9/1990 | Gilloire et al. | |
| 4,984,265 A * | 1/1991 | Connan et al. | 379/406.07 |
| 5,087,982 A | 2/1992 | Smothers | |
| 5,136,577 A | 8/1992 | Amano et al. | |
| 5,263,079 A | 11/1993 | Umemoto | |
| 5,272,695 A | 12/1993 | Makino et al. | |
| 5,278,900 A | 1/1994 | Van Gerwen et al. | |
| 5,283,784 A | 2/1994 | Genter | |
| 5,305,307 A | 4/1994 | Chu | |
| 5,307,405 A | 4/1994 | Sih | |
| 5,371,789 A | 12/1994 | Hirano | |
| 5,416,829 A | 5/1995 | Umemoto | |
| 5,463,618 A | 10/1995 | Furukawa et al. | |
| 5,475,731 A * | 12/1995 | Rasmusson | 379/3 |
| 5,553,014 A * | 9/1996 | De Leon et al. | 708/322 |
| 5,559,881 A | 9/1996 | Sih | |
| 5,610,909 A | 3/1997 | Shaw | |
| 5,631,899 A * | 5/1997 | Duttweiler | 370/291 |
| 5,631,900 A | 5/1997 | McCaslin et al. | |
| 5,633,936 A | 5/1997 | Oh | |
| 5,636,272 A | 6/1997 | Rasmusson | |
| 5,646,991 A | 7/1997 | Sih | |
| 5,661,813 A | 8/1997 | Shimauchi et al. | |
| 5,668,794 A | 9/1997 | McCaslin et al. | |
| 5,687,229 A | 11/1997 | Sih | |
| 5,732,134 A | 3/1998 | Sih | |
| 5,737,410 A | 4/1998 | Vahatalo et al. | |
| 5,796,819 A * | 8/1998 | Romesburg | 379/406.09 |

(Continued)

*Primary Examiner* — Edgardo San Martin
(74) *Attorney, Agent, or Firm* — Traskbritt

(57) ABSTRACT

Disclosed herein are conferencing products implementing an acoustic echo cancellation system that utilizes converging coefficients and a detector of turn-off and/or turn-on events of push-to-talk microphones, and, further, that mitigates against divergence and/or drift of coefficients and other variables of an echo canceller. A push-to-talk detector may be used that includes a high-pass filter, a transient detector, or an adjustable high-pass filter. An echo canceller may be disabled as to a push-to-talk microphone that has been turned off.

15 Claims, 9 Drawing Sheets

U.S. PATENT DOCUMENTS

| | | | |
|---|---|---|---|
| 5,818,945 A | 10/1998 | Makino et al. | |
| 5,859,914 A | 1/1999 | Onon et al. | |
| 5,920,834 A | 7/1999 | Sih et al. | |
| 5,933,494 A | 8/1999 | Yang et al. | |
| 5,933,495 A | 8/1999 | Oh | |
| 5,937,009 A | 8/1999 | Wong et al. | |
| 5,937,060 A | 8/1999 | Oh | |
| 6,001,131 A | 12/1999 | Raman | |
| 6,052,462 A | 4/2000 | Lu | |
| 6,125,179 A | 9/2000 | Wu | |
| 6,147,979 A | 11/2000 | Michel et al. | |
| 6,148,078 A | 11/2000 | Romesburg | |
| 6,151,397 A | 11/2000 | Jackson, Jr. II et al. | |
| 6,160,886 A | 12/2000 | Romesburg et al. | |
| 6,163,608 A | 12/2000 | Romesburg et al. | |
| 6,212,273 B1 | 4/2001 | Hemkumar et al. | |
| 6,246,760 B1 | 6/2001 | Makino et al. | |
| 6,263,078 B1 | 7/2001 | McLaughlin et al. | |
| 6,278,785 B1 | 8/2001 | Thomasson | |
| 6,282,176 B1 | 8/2001 | Hemkumar | |
| 6,301,357 B1 * | 10/2001 | Romesburg | 379/406.06 |
| 6,381,224 B1 | 4/2002 | Lane et al. | |
| 6,385,176 B1 | 5/2002 | Iyengar et al. | |
| 6,434,110 B1 | 8/2002 | Hemkumar | |
| 6,466,666 B1 | 10/2002 | Eriksson | |
| 6,487,535 B1 | 11/2002 | Smyth et al. | |
| 6,496,581 B1 | 12/2002 | Finn et al. | |
| 6,507,653 B1 | 1/2003 | Romesburg | |
| 6,516,062 B1 | 2/2003 | Yang et al. | |
| 6,542,611 B1 | 4/2003 | Lane et al. | |
| 6,556,682 B1 | 4/2003 | Gilloire et al. | |
| 6,563,803 B1 | 5/2003 | Lee | |
| 6,597,787 B1 | 7/2003 | Lindgren et al. | |
| 6,694,018 B1 | 2/2004 | Omori | |
| 6,704,415 B1 | 3/2004 | Katayama et al. | |
| 6,718,036 B1 | 4/2004 | Van Schyndel et al. | |
| 6,724,736 B1 | 4/2004 | Azriel | |
| 6,768,796 B2 | 7/2004 | Lu | |
| 6,792,107 B2 | 9/2004 | Tucker et al. | |
| 6,799,062 B1 * | 9/2004 | Piket et al. | 455/569.1 |
| 6,836,547 B2 | 12/2004 | Tahernezhaadi | |
| 6,859,531 B1 | 2/2005 | Deisher | |
| 6,868,157 B1 | 3/2005 | Okuda | |
| 6,928,161 B1 | 8/2005 | Graumann | |
| 6,931,123 B1 | 8/2005 | Hughes | |
| 6,944,289 B2 | 9/2005 | Tahernezhaadi et al. | |
| 6,947,549 B2 | 9/2005 | Yiu et al. | |
| 6,950,513 B2 | 9/2005 | Hirai et al. | |
| 6,961,422 B2 | 11/2005 | Boland | |
| 6,961,423 B2 | 11/2005 | Pessoa et al. | |
| 6,963,648 B2 | 11/2005 | Wilder | |
| 6,990,194 B2 * | 1/2006 | Mikesell et al. | 379/406.04 |
| 7,003,096 B2 | 2/2006 | Lashlet et al. | |
| 7,016,488 B2 | 3/2006 | He et al. | |
| 7,031,269 B2 | 4/2006 | Lee | |
| 7,035,397 B2 | 4/2006 | Diethorn | |
| 7,046,794 B2 | 5/2006 | Piket et al. | |
| 7,092,516 B2 | 8/2006 | Furuta et al. | |
| 7,117,145 B1 | 10/2006 | Venkatesh et al. | |
| 7,155,018 B1 | 12/2006 | Stokes, III et al. | |
| 7,171,003 B1 | 1/2007 | Venkatesh et al. | |
| 7,177,416 B1 | 2/2007 | Zhang et al. | |
| 7,203,308 B2 | 4/2007 | Kubota | |
| 7,212,628 B2 | 5/2007 | Popovic et al. | |
| 7,215,765 B2 | 5/2007 | Dyba et al. | |
| 7,231,036 B2 | 6/2007 | Akie | |
| 7,536,006 B2 * | 5/2009 | Patel et al. | 379/406.03 |
| 7,912,211 B1 * | 3/2011 | Lambert | 379/406.08 |
| 2001/0001853 A1 * | 5/2001 | Mauro et al. | 704/233 |
| 2002/0041678 A1 | 4/2002 | Basburg-Ertem et al. | |
| 2002/0054685 A1 | 5/2002 | Avendano et al. | |
| 2003/0007633 A1 | 1/2003 | Tucker et al. | |
| 2003/0053617 A1 | 3/2003 | Diethorn | |
| 2003/0123674 A1 | 7/2003 | Boland | |
| 2003/0133565 A1 | 7/2003 | Chang et al. | |
| 2003/0174661 A1 | 9/2003 | Lee | |
| 2003/0185402 A1 | 10/2003 | Benesty et al. | |
| 2003/0219113 A1 | 11/2003 | Bershad et al. | |
| 2003/0235244 A1 | 12/2003 | Pessoa et al. | |
| 2003/0235294 A1 | 12/2003 | Dyba et al. | |
| 2003/0235295 A1 | 12/2003 | He et al. | |
| 2003/0235312 A1 | 12/2003 | Pessoa et al. | |
| 2004/0001450 A1 | 1/2004 | He et al. | |
| 2004/0062386 A1 | 4/2004 | Tahernezhaadi et al. | |
| 2004/0071284 A1 | 4/2004 | Abutalebi et al. | |
| 2004/0161101 A1 | 8/2004 | Yiu et al. | |
| 2004/0170271 A1 | 9/2004 | Kubota | |
| 2004/0208312 A1 | 10/2004 | Okuda | |
| 2004/0228474 A1 | 11/2004 | Taniguchi et al. | |
| 2004/0240664 A1 * | 12/2004 | Freed | 379/406.01 |
| 2004/0247111 A1 | 12/2004 | Popovic et al. | |
| 2005/0123129 A1 | 6/2005 | Awad et al. | |
| 2005/0129225 A1 | 6/2005 | Piket et al. | |
| 2005/0143016 A1 | 6/2005 | Becker et al. | |
| 2005/0207566 A1 | 9/2005 | Ohki et al. | |
| 2005/0286697 A1 | 12/2005 | Bathurst et al. | |
| 2005/0286714 A1 | 12/2005 | Tokuda | |
| 2006/0013383 A1 | 1/2006 | Barron et al. | |
| 2006/0013412 A1 | 1/2006 | Goldin | |
| 2006/0018457 A1 | 1/2006 | Unno et al. | |
| 2006/0018458 A1 | 1/2006 | McCree et al. | |
| 2006/0018459 A1 | 1/2006 | McCree | |
| 2006/0018460 A1 | 1/2006 | McCree | |
| 2006/0034448 A1 | 2/2006 | Parry | |
| 2006/0067519 A1 | 3/2006 | Stenger | |
| 2006/0069556 A1 | 3/2006 | Nadjar et al. | |
| 2006/0140392 A1 | 6/2006 | Ahmadi | |
| 2006/0147029 A1 | 7/2006 | Stokes, III et al. | |
| 2006/0198329 A1 | 9/2006 | Fang et al. | |
| 2006/0198511 A1 | 9/2006 | Su et al. | |
| 2006/0222172 A1 | 10/2006 | Chhetri et al. | |
| 2006/0235698 A1 | 10/2006 | Cane et al. | |
| 2007/0019803 A1 | 1/2007 | Merks et al. | |
| 2007/0021958 A1 | 1/2007 | Visser et al. | |
| 2007/0038442 A1 | 2/2007 | Visser et al. | |
| 2007/0047738 A1 | 3/2007 | Ballantyne et al. | |
| 2007/0058798 A1 | 3/2007 | Takada | |
| 2007/0058799 A1 | 3/2007 | Sudo | |
| 2007/0071254 A1 | 3/2007 | Marton | |
| 2007/0092074 A1 | 4/2007 | Takada | |
| 2007/0121925 A1 | 5/2007 | Cruz-Zeno et al. | |
| 2007/0133442 A1 | 6/2007 | Masuda et al. | |
| 2007/0140059 A1 | 6/2007 | Guion et al. | |
| 2007/0189508 A1 | 8/2007 | Knutson et al. | |
| 2007/0189547 A1 | 8/2007 | Hsu et al. | |
| 2007/0263823 A1 | 11/2007 | Jalava et al. | |
| 2008/0147392 A1 | 6/2008 | Shaffer et al. | |
| 2010/0017205 A1 * | 1/2010 | Visser et al. | 704/225 |

* cited by examiner

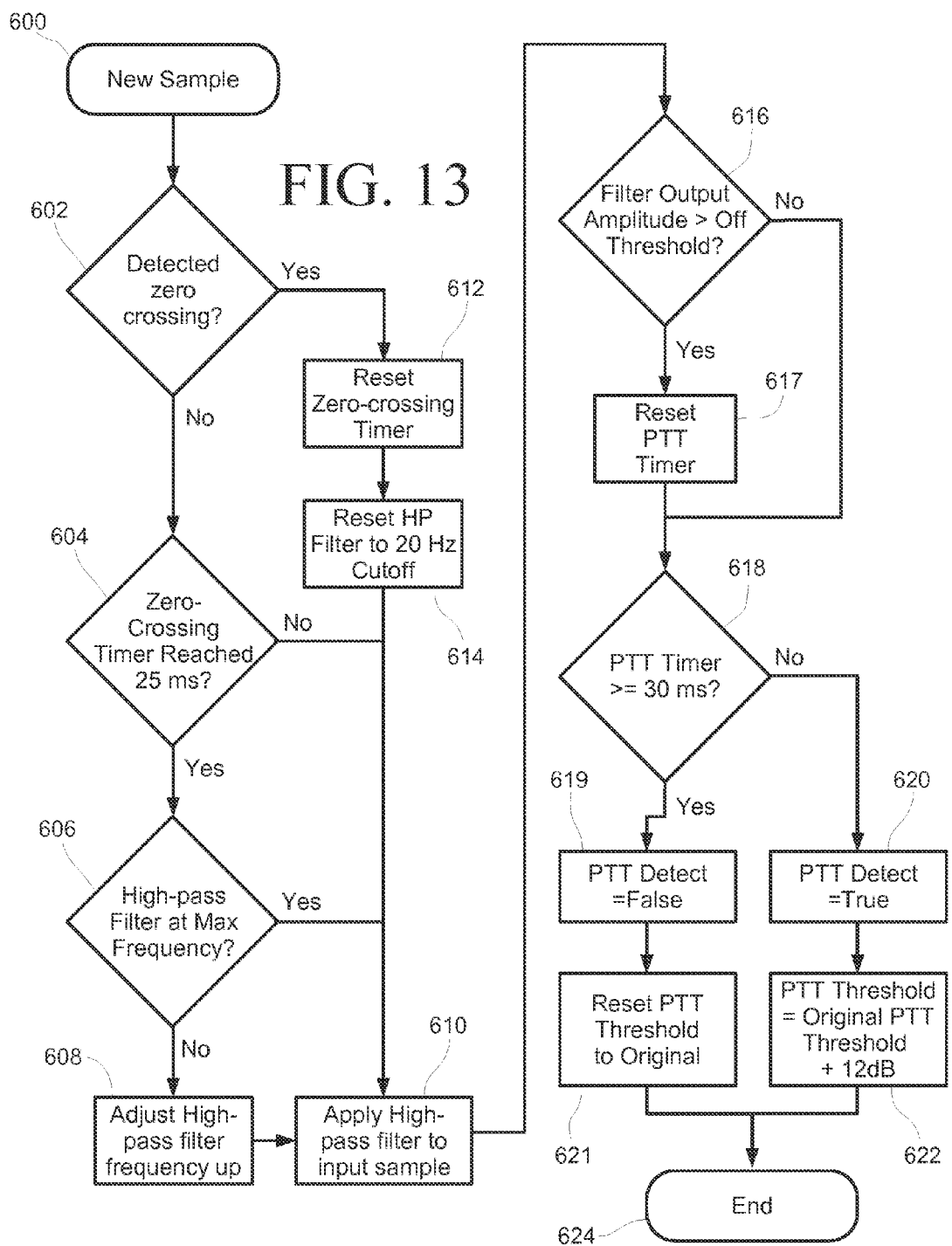

FIG. 14A
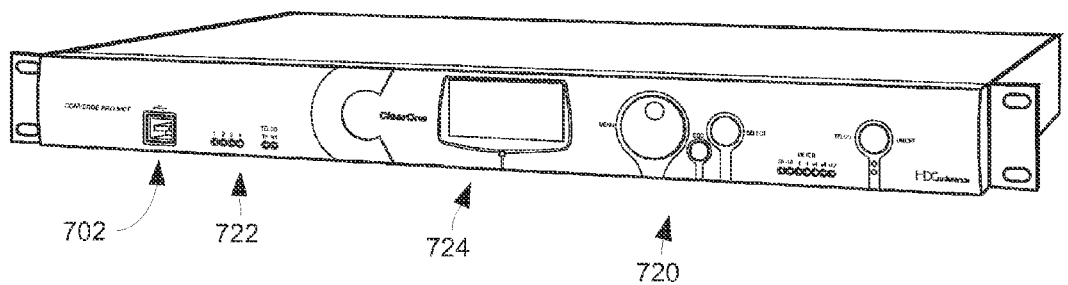
FIG. 14B
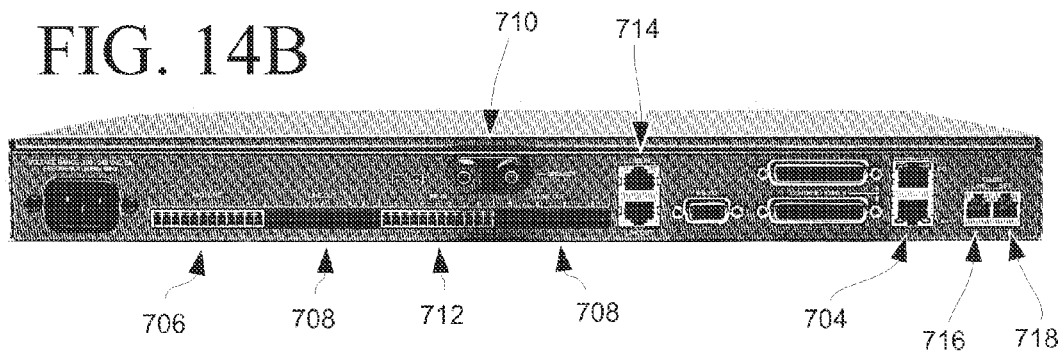
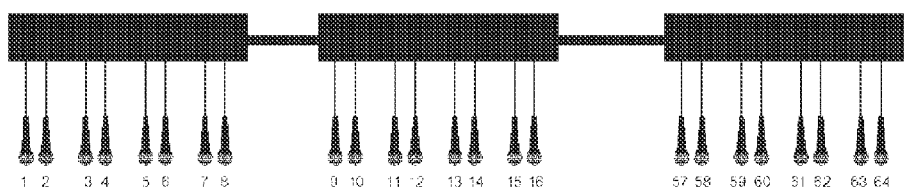
FIG. 14C

CONFERENCING SYSTEM IMPLEMENTING ECHO CANCELLATION AND PUSH-TO-TALK MICROPHONE DETECTION USING TWO-STAGE FREQUENCY FILTER

CROSS-REFERENCE TO RELATED APPLICATION

This application shares a common specification with U.S. patent application Ser. No. 11/933,354, filed Oct. 31, 2007, which is now abandoned.

TECHNICAL FIELD

The claimed systems and methods relate generally to loudspeaker conferencing systems that can connect to distant participants and provide echo cancellation, and more particularly to those systems that can connect to push-to-talk microphones and provide mitigation against divergence in the event of an unrecognized microphone turn-off or turn-on event.

BACKGROUND ART

The basic elements of an installation-type conferencing system are now described in connection with FIG. 1. The main element of the system is equipment 100, which generally processes incoming and outgoing signals, and may also include certain control and sound quality functions, some of which are described below. This type of conferencing system is referred to as "installation-type," as equipment 100 is intended to be fixed in place in the local environment, as opposed to certain portable conferencing system devices such as the CHAT® 50 or the CHAT® 150 available from ClearOne Communications, Inc., of Salt Lake City, Utah, which can be moved from room to room or from tabletop to tabletop without the installation of cables and wires within a room. One or more local microphones, 104a to 104n, are normally installed within the room environment to pick up the speech of room participants, the signals of which are routed to equipment 100. Equipment 100 contains electronics or intelligence to combine the local microphones 104a to 104n as appropriate, for example, by switching between them or by the mixing of signals.

Certain signals present in equipment 100 are intended to be delivered to local participants. To this end, equipment 100 is connected to a public address and/or amplification system 102 for delivery to one or more speakers 106a to 106n. These speakers 106a to 106n are often mounted in the ceiling or high on a wall in the room in which conferences are to take place. Note that amplification system 102 may not necessarily be distinct from equipment 100, but, rather, equipment 100 may include such amplification circuitry if that is desired. However, a separate amplification system 102 is often used, such that audio from other sources 110 may be produced at the speakers 106a to 106n, for example, from audio-visual equipment, intercom or public address systems.

Those elements alone are sufficient to fashion a local conferencing system in which all of the participants are located in the same room, and it will become clear that certain of the inventions described herein are applicable thereto. However, it is often the case that a conference will involve distant participants that are not located within the room environment of the conferencing system. Therefore, equipment 100 may also include one or more incoming ports 108a to 108n and one or more outgoing ports 109a to 109n. Note that incoming and outgoing ports are usually paired, so that a distant participant can both speak and hear a conference.

A conference, as the term is used herein, may occur in many environments and is not restricted to the traditional definition. Herein, a conference is a meeting between participants utilizing a system that produces room-audio that is exposed to microphones connected to that system. So, for example, a conference may occur in a classroom 120 setting, such as that shown in FIG. 2A. Here, a number of student stations (including a chair and a desk) are arranged with a view of video monitors 124. The system permits students to interact with a classroom lecture or discussion through microphones 122 built into the desk surfaces. An audio system, not shown, produces audible sound into the room, which is both heard by the room participants and picked up by microphones 122.

FIG. 2B depicts a more traditional conferencing environment, a boardroom 126, with multiple microphones 122 for local participant use and monitors 124 with which distant participants may be seen, if a video feed is provided. Here, wall-mounted speakers 123 are provided and connected to the conferencing equipment for the production of sound into the boardroom 126 generally.

A conferencing system, however, may vary from these conceptual peer-based models. For example, as illustrated in FIG. 2C, a conferencing system may be incorporated into a courtroom 128 which may include traditional public address and/or amplification functions. Microphones 122 may be provided for a central speaker at a podium, at the tables at which counsel may be seated, at the judge's bench, at the witness stand, etc. Traditionally, all the participants to a hearing or trial would be physically present in the courtroom 128. However, courts have begun to recognize that a participant may be "present" as to a proceeding but not be physically present in the courtroom 128 through the use of audio and audio/video links. For example, a hearing on a routine motion might be conducted with one or more of the parties' counsel present over the telephone. In another example, it may be desirable to avoid exposing a witness to the pressures of a courtroom 128, for example, a child witness. Regardless, the audio of the participants will be produced in the courtroom 128 environment and picked up by the microphones 122.

Because of the coupling between the speakers and microphones in a room, a certain undesirable effect is introduced, hereinafter called "echo," which will now be discussed in connection with FIG. 3. Echo is produced in a system 200 where a distant participant is involved. Here, a distant participant is included in a conference through a carrier medium 212, which may be, for example, a telephone line, an Internet connection or a long-distance radio or satellite connection. The audio from a distant participant is produced at speaker 202, carried through path 214, picked up at microphone 204, and delivered again to the distant participant who hears an echo of himself with a delay equal to two times the propagation delay over the carrier medium 212 plus the audio delay at path 214. Echo is not generally objectionable where the distant participant is located relatively close by (i.e., in the same building) but may become distracting where the echo delay is more than a few milliseconds.

To deal with echo, a traditional method is to use half-duplex operation. Here, system 200 would detect the presence of far-side audio (from the distant participant) and effectively turn off microphone 204 (which could be done by zeroing the outgoing signal) to avoid the distant party's speech being echoed back. This method has the undesirable effect of preventing both parties speaking simultaneously, and because the local participants cannot interrupt the far-side participant a conversation tends to have a perceived unnatural flow.

Certain of the more advanced conferencing systems implement an echo controller 216, which can effectively solve both of the problems of echo even where the conference proceeds in full-duplex. This is done generally by predicting the signal received at microphone 204 from the signal produced at speaker 202 and delivered over audio path 214. That predicted signal can be subtracted from the actual signal received at microphone 204, theoretically leaving only the audio of any local participants as heard by the distant participants. Predicting that signal is complex, and is affected by the frequency responses of the speaker 202 and microphone 204, and the sum of the echo paths 214 in a room at any given time. A description of a system that handles that complexity appears below, however, that particular configuration is not necessary to implement the techniques and products described and/or claimed herein.

Herein a distinction is recognized between two types of microphones. The first type of microphone is depicted in FIG. 4A, which is identified herein as a "continuous signal microphone." In that type of microphone, as with all microphone types, a microphone element 300 is included that is a transducer converting sound waves into an electronic signal, which is usually characterized as a voltage-modulated signal for a microphone. A amplifier/receiver 302 is also included, electrically connected to element 300 which receives a signal from element 300 and controls the input impedance seen by element 300 to maintain a proper voltage range for other electronics, not shown. Now it is to be understood that other electronic components might appear between an element 300 and a receiver 302 such as pull-ups, pull-downs, amplifiers, etc., and that this figure merely illustrates in a simplified manner.

In the continuous signal microphone of FIG. 4A, element 300 is always connected to receiver 302. Thus, receiver 302 always receives an active signal from element 300. If a mute function is implemented, it is by way of a separate switch 304a or other control and input 306. Input 306 is available to conferencing system electronics to mute the microphone signal from receiver 302, which might be done, for example, by zeroing the signal or by omitting the signal from a mixer.

A continuous signal microphone is common in certain electronic devices. For example, many telephone handsets include a mute button. That button is not directly connected to the microphone element, but rather is a control input to the telephone electronics which performs the mute function. Other continuous signal microphone inputs may be provided through a GUI control, by an electronic signal, or other means.

In contrast, other types of microphones are intended to incorporate a mute function within the microphone electronics. Referring now to FIG. 4B, such a microphone is pictured with an element 300 and a receiver 302. A switch or gate 304b is also included, in this example opening the connection between element 300 and receiver 302 when in a mute position. It is to be recognized that this configuration is merely exemplary; the interruption of the signal could occur by other means, for example, by shorting a signal line. The distinguishing feature of this type of microphone is that no separate control input is provided by the microphone; rather, the muting of an input signal is done by interrupting the microphone signal. The result of this is that the conferencing electronics are not provided a definitive status of the mute function of the microphone, which microphone type is referred to as a "push-to-talk" microphone herein.

The microphone shown in FIG. 4B is but one type of push-to-talk microphone. In those microphones, switch 304b is provided near the microphone and often in the microphone housing. There, switch 304b will be configured to be normally open, such that a participant must press the button to cause the microphone to become active and not muted. For the purposes of this disclosure and the claims, the term push-to-talk includes not only microphones with normally open muting switches, but also normally closed and other switch types, and also other mute control inputs integrated into or with a microphone that do not provide a status signal to the conferencing system electronics, as will become clear from the discussion below.

The reader is referred to the following U.S. patents for background information. U.S. Pat. No. 5,933,495 to Oh describes a subband acoustic echo canceller that includes the freezing of filter coefficients on detection of near-end speech. U.S. Pat. No. 5,937,060, also to Oh, describes a residual echo suppression system in connection with an echo canceller. U.S. Pat. No. 6,990,194 to Mikesell et al. describes the use of subbanded voice activity detectors coupled to an echo cancelling circuit. All of these references are hereby incorporated by reference as background material for the description that proceeds below.

SUMMARY OF INVENTION

Disclosed herein are conferencing products implementing an acoustic echo cancellation system utilizing converging coefficients and a detector of turn-off and/or turn-on events of push-to-talk microphones, and, further, of mitigating against the divergence and/or drift of the coefficients and other variables of an echo canceller. A push-to-talk detector may be used that includes a high-pass filter, a transient detector, or an adjustable high-pass filter. An echo canceller may be disabled as to a push-to-talk microphone that has been turned off. Detailed information on various example embodiments of the inventions are provided in the Detailed Description below, and the inventions are defined by the appended claims.

DESCRIPTION OF DRAWINGS

FIG. 13 depicts a method of performing push-to-talk microphone muting and unmuting detection.

FIG. 14A shows a conferencing product from the front in which a push-to-talk detector may be implemented.

FIG. 14B shows a conferencing product from the rear in which a push-to-talk detector may be implemented.

FIG. 14C shows the interconnection of several conferencing products in a family including the product depicted in FIGS. 14A and 14B.

DESCRIPTION OF EMBODIMENTS

Figure 1:
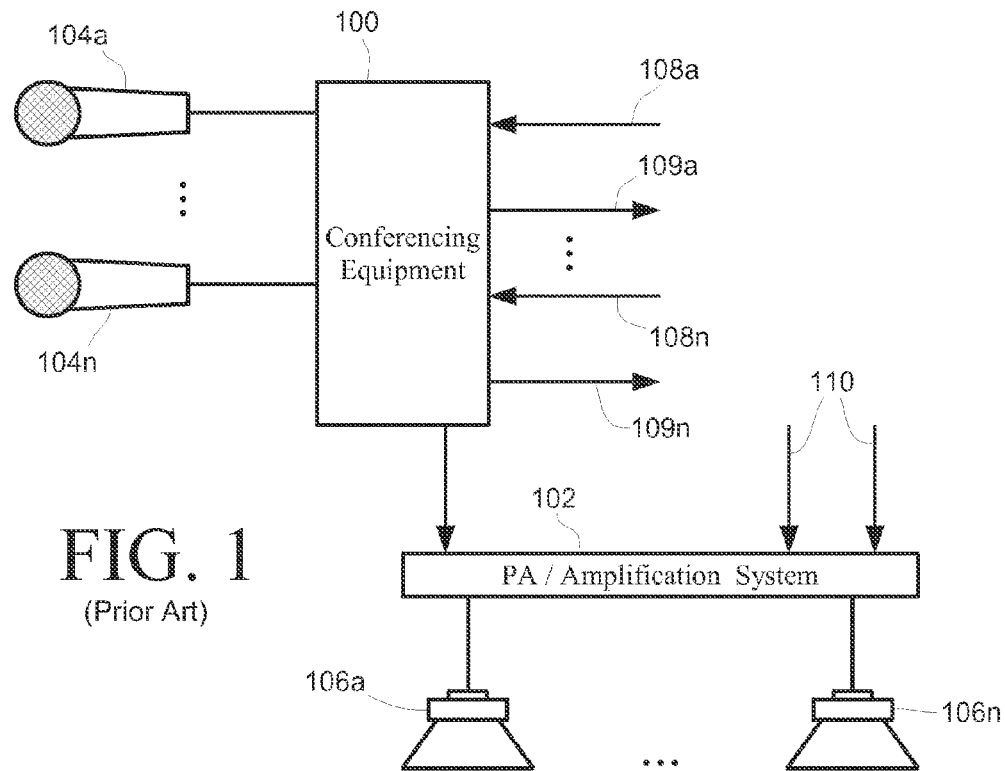
FIG. 1 depicts elements of an installed conferencing system capable of communicating with distant participants.

Reference will now be made in detail to particular implementations of the various inventions described herein in their various aspects, examples of which are illustrated in the accompanying drawings and in the detailed description below.

A discussion of certain products, systems, methods and principles is now undertaken for the purpose of disclosing and enabling one of ordinary skill in the art to make and use the inventions. The discussion of particular of these is merely for convenience, and it is to be understood that certain substitutions and modifications may be made to the products and systems described herein without departing from the disclosed and claimed inventions. For example, in today's signal processing equipment an audio signal may be represented as a stream of audio data, and these are synonymous herein to their respective analog and digital domains. Likewise, where an implementation is described as hardware, it can just as easily be made with software, and vice versa. One or more exemplary products are presented with features as described above, which may contain one implementation of the inventions described herein. Where an invention is described with reference to any particular implementation, it is to be understood that this is merely for convenience of description and the inventions so described are not limited to the implementations contained herein.

Echo Cancellation Concepts

The discussion that proceeds in the next paragraph references a simple case where a system contains a constant microphone or set of microphones which act in concert as an input. The reader should note that systems may also contain microphone sets that can be switched in and out or on and off. As microphones are switched on or off, the effect of echoes in a room changes, and thus an echo canceller may become incoherent. For these systems, it may be acceptable in some circumstances to implement a common echo canceller (operating on the sum of the active or all of the microphones) if the echo canceller never becomes so incoherent as to become perceptively ineffective. Alternatively, a system may implement multiple echo cancellers, generally one per each divisible microphone or microphone set. Thus, if all microphones in a system are on/off switchable, the most effective echo-canceling configuration is one echo canceller for each microphone. There, generally, each coupled echo canceller may be enabled or disabled with the microphone that it services. Because the contribution of echo to each microphone is removed per that microphone, the mixing of multiple microphones does not introduce echo, so long as the echo is effectively cancelled at each microphone. It is to be recognized, however, that additional computation and, perhaps, hardware are necessary to implement this type of distributed configuration. However, one processor might service a number of single microphone or microphone set echo cancellers if sufficient processing resources are allocated.

A conferencing product may include an echo-cancellation function, which may or may not utilize frequency decomposition, which is the application of audio data processing in subbands. Such products need not utilize frequency decomposition, but may rather process wideband audio data if desired. The use of echo cancellation allows for increased audio quality in full-duplex operation by preventing certain echoes and feedback. An echo canceller may utilize a finite impulse response (FIR) or infinite impulse response (IIR) filter, which filters include a number of coefficients representing the sum of the echo paths in the environment of the product in operation. The echo canceller may produce an echo cancellation signal, which is a continuous signal that is either added to or subtracted from the signal received at the one or more microphones.

For products implementing an FIR or IIR echo canceller, the coefficients are adapted or converged over a period of time where there is incoming audio from a distant participant but silence at the product's local microphones. The adaptation of coefficients may be through a converger or adapter that applies an iterative method to arrive at an echo cancellation solution. Coefficient adaptation may be controlled such that those coefficients are adapted generally where there is a substantial far-end audio signal and no detected sound produced in the local environment.

A doubletalk detector may be included to discriminate between a condition of far-end audio only, and a condition of audio on the near- and far-end of the conversation, which is called doubletalk. The doubletalk detector may track the conversation between conferees to identify appropriate times to engage coefficient adaptation. A secondary method of evaluating a doubletalk detector and/or an echo canceller may be used. In one example, the doubletalk detector relies on coefficient coherence with the existing echo paths, and a change to the echo paths in the vicinity of the product may produce poor echo cancellation. If the echo cancellation is seriously degraded, coefficient adaptation will not occur because a doubletalk detector may cease to function. A secondary confirmatory doubletalk detector may be used to confirm the proper operation of a primary doubletalk detector, which may use differing frequency bands. A secondary doubletalk detector may indicate false doubletalk, or a failure to identify the absence of near-end audio in the presence of far-end audio, which may be indicated if doubletalk between the detectors is not contemporaneous or substantially similar.

When and if false doubletalk is detected, a product may reset an included echo canceller, which may include resetting the filter coefficients, entering a period of accelerated adaptation or resetting to a power-on state. A state of half-duplex operation may be entered while confidence in the echo canceller or its coefficients is low, which may also occur after false doubletalk is detected. A non-presumptive method of doubletalk detection may be used to detect false doubletalk or act as a backup doubletalk detection method.

A conferencing product may include more than one communication port for communicating participants in more than one location. Others of the products may be connected to an audio signal source at the same time as a connection with a distant participant. A conferencing system utilizing echo cancellation may feed the audio between two distant participants to each other, otherwise they might not hear each other. A conferencing product may also be configured or switched such that the audio from one participant is not transmitted to another, thereby permitting a partial private audio line from a distant participant to the local participants. By replacing a connection to a conferee with a connection to an audio source, which could be any source of audio, including a playback device or a broadcast receiver, a local participant may listen to that audio source while not transmitting that audio to distant participants. The configuration may be by a physical, logical or a software switch, which can be implemented as a checkbox or other graphical control element. This effect may be one-way, meaning that one party is private, or multi-way if it is desired to keep the speech of more than one party private from the others. The effect may be controllable, even during a conference, if it is desired to have a partially private conference for part of the time.

Figure 3:
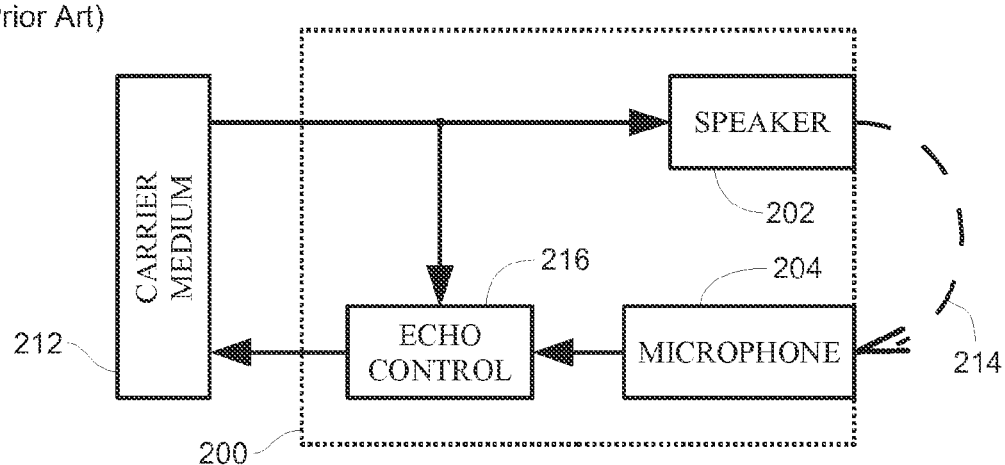
FIG. 3 illustrates acoustic echo and the operation of an echo canceller.

Referring again to FIG. 3, to deal with the complexity of real-world echo paths 214, controller 216 may implement echo cancellation through use of a finite impulse response (FIR) filter, with the received far-side audio signal as input. The FIR filter utilizes a finite number of coefficients of a length sufficient to cover the longest path 214 of significance expected in operation. The reader should recognize that acoustic echoes will be, in general, of longer duration and greater complexity than telephonic line echoes. An acoustic echo canceller therefore requires a much larger number of coefficients to provide echo cancellation, which might cover a number of seconds in a device designed for operation in high-echo rooms (rooms with parallel walls and no carpeting.) These coefficients are applied to a copy of the incoming audio, providing the predicted echo component received at the microphone. The determination of these coefficients is by an iterative method, generally understood by those skilled in the art, and will not be further described here for the sake of brevity. In theory, the FIR coefficients could be determined by the application of a step function to the speaker and a recording of the received audio (in reverse) received at the microphone.

In practice, however, the convergence of the FIR coefficients depends mainly on the presence of an incoming audio signal and the general absence of near-side sound apart from that produced by the device's speaker. The concepts related to the convergence operation are illustrated in connection with the diagram shown in FIG. 5. Every conferencing device connecting to a distant party includes an incoming audio port 400, an outgoing audio port 401, a speaker or sound-producer 402 and a microphone or pickup 403. This system also implements an FIR echo canceller 406, the output of which is added to an outgoing audio signal at 411. Although it is not a requirement, sound may be processed in frequency bands by decomposing the incoming signal at analyzer 404 and the microphone signal at analyzer 410. The band signals would then be brought together at frequency synthesizer 407 into a wideband signal. (A corresponding wideband version of this system merely omits the frequency analysis and synthesis.)

Three meters are used to determine the state of the audio conversation. An incoming audio meter 405 measures the volume of the incoming signal. A pre-EC meter 409 measures the volume at the microphone, and a post-EC meter 408 measures the outgoing signal after echo cancellation. These meters 405, 408, 409 are not intended to present instantaneous readings, but rather indicate the amplitude of their respective signals over a period of time, for example, by the use of a peak detector with a decay over a period (which may be on the order of 20 to 30 samples at 16 kHz up to around one second for human conversation.) An indication of good FIR coefficient adaptation is a high volume detected before echo cancellation and a low volume afterward, which can generally only occur if there is significant coupled far-side audio in the absence of near-side audio.

To avoid non-convergence or divergence of the FIR coefficients, the convergence operation should be enabled while there is an incoming far-side signal, with near-side audio at a volume about less than the desired degree of echo cancellation. Operation in the presence of a near-side signal may introduce random errors into the coefficients, while operation with a weak far-side signal can result in a non-converging filter. The first general condition of operation, therefore, is that convergence should only proceed while there is a significant signal at incoming audio meter 405.

The second general condition of operation is that convergence should not proceed while there is a substantial near-side signal. As will be discussed below in connection with one method, if the FIR coefficients are well adapted, the system can detect this condition again by periods of low amplitude at meter 408 and higher amplitude at meter 409. If badly adapted, such a condition will generally not occur. Rather, meter 408 will tend to track meter 409 until the FIR echo canceller 406 begins to be effective. Or, in the case where the coefficients have badly diverged, meter 408 can have a higher amplitude than meter 409. In this case, the FIR echo canceller 406 is producing echo. Regardless of the state of the FIR echo canceller 406, the system can detect the presence of near-side audio in the absence of far-side audio, because meter 409 will be high and meter 408 will be low. The remaining two states are the most difficult to discriminate between.

Those two more difficult states are "far-end singletalk," the condition of having far-end audio but no near-end audio, and "doubletalk," which is audio on both sides. Since it is desirable to perform convergence only in the presence of singletalk, a reliable doubletalk detector contributes greatly to rapid convergence and reliable adaptation of an FIR echo canceller.

Tracking Conversations

Figure 7:
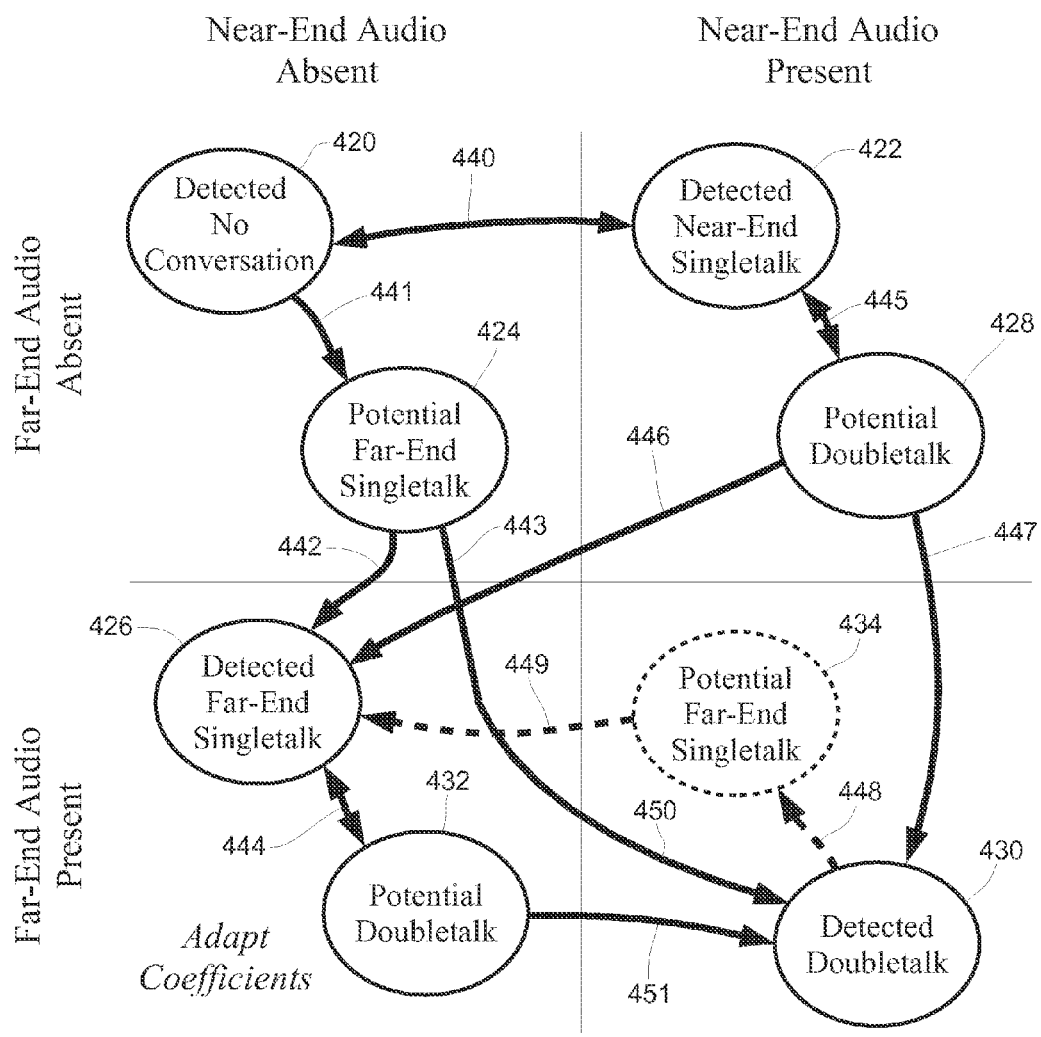
FIG. 7 illustrates the operation of a conversational tracker.

A conversational tracker conceptually similar to the state machine as that shown in FIG. 7 may be used. There, the conversation is divided between four quadrants corresponding to the presence or absence of near- and far-end audio. As this state diagram is discussed, the reader will note that the state machine may lag behind the actual conversational state. In practice, this latency does not meaningfully affect echo cancellation if the coefficient adaptation is sufficiently slow, i.e., adaptation is not performed too long after the actual conversation departs from far-end singletalk. In one particular product, the echo canceller is adapted after about 10 seconds of far-end singletalk under nominal conditions. As this state machine is discussed, complications and problems associated with the detection of doubletalk will become more apparent.

The purpose of tracking a conversation in operation is mainly to apply coefficient adaptation at correct times and to detect potentially erroneous operation, i.e., improper echo cancellation. Again, coefficient adaptation is to occur in the presence of far-end audio and in the absence of near-end audio, so adaptation should occur in the lower-left quadrant in FIG. 7.

Figure 5:
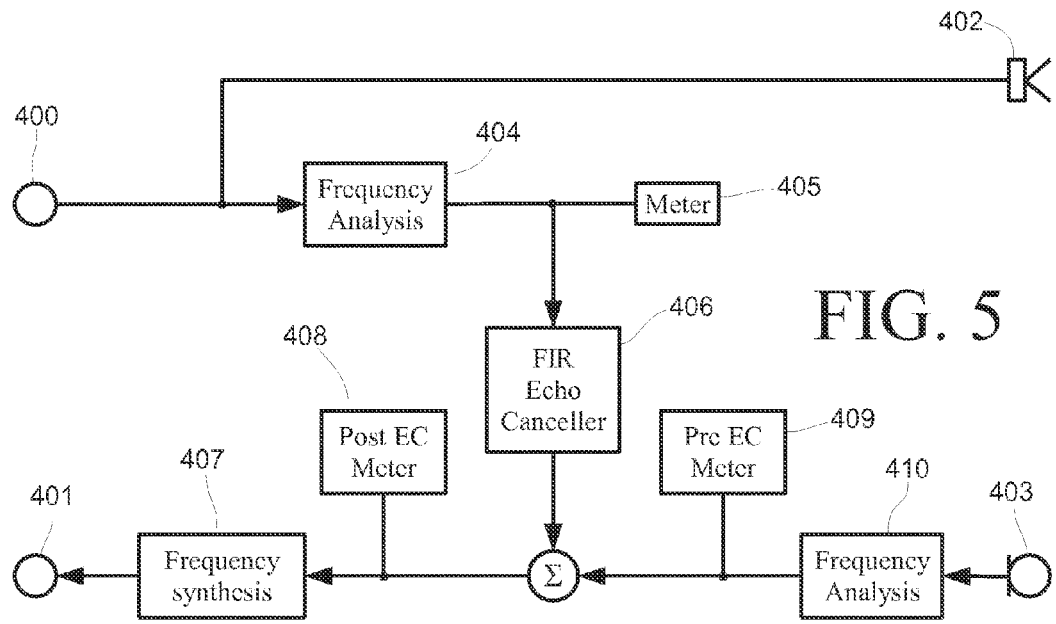
FIG. 5 illustrates the operation of an acoustic echo canceller.

Now entering into the specifics of the machine shown in FIG. 7 in reference to the metered cancellation system shown in FIG. 5, a first state 420 is entered any time the audio levels on both the near and far sides drop below specified thresholds. No conversation is by far the easiest condition to detect, which in the system of FIG. 5 may be detected by a low level at incoming audio meter 405 and at pre-EC meter 409. Again, those meters do not measure instantaneous levels, but rather measure amplitudes over a number of samples. A return to the state 420 of detected no conversation may be conditioned on a period of silence, for example, 0.5 second, to avoid a state change on momentary spaces or pauses between the words of participants. To simplify the diagram of FIG. 7, the return paths to state 420 are not shown, but it should be understood that a return to that state 420 will occur when no conversation is taking place.

At some point, audio above threshold levels will be detected at the near or far sides. The conversational state of near-end audio present but no far-end audio is also relatively easily detected. A high amplitude at the pre-EC meter 409 combined with a low incoming amplitude at incoming audio meter 405 conclusively determines this state. In the state machine, the detected near-end singletalk state 422 is then registered. If the near side ceases to speak, state may return to no-conversation 420.

Detection of an audio level at incoming audio meter 405 causes the state machine to detect potential far-end singletalk 424. The uncertainty lies in the fact that pre-EC meter 409 will be high, regardless of whether near-end audio is present. Methods may be used to discriminate between these two, as will be discussed below. After a time, a determination will be made whether a far-end singletalk or a doubletalk condition is present. If doubletalk is deemed to be present, state 430 will be entered. Otherwise, state 426 will be entered bringing the assessment of the conversation into the lower-left quadrant, and coefficient adaptation will proceed.

Likewise, if incoming audio is detected by incoming audio meter 405 while in a state 422 of near-end singletalk, a transitory state 428 of potential doubletalk may be entered. There, a determination will be made to enter doubletalk state 430 or far-end singletalk state 426, or, if far-end audio ceases, return to near-end singletalk state 422.

In a state 426 of conversational far-end singletalk only, a detection may indicate doubletalk. Another transitory state 432 may be entered, more or less to filter short doubletalk events that are not of sufficient length to significantly affect the cancellation coefficients. If doubletalk continues, state 430 is entered. The entry of a state 434 is a design choice, permitting return to a far-end singletalk state 426. From any of the states shown, a return to one of states 420 or 422 may occur at any time if incoming audio drops out.

Now the state diagram of FIG. 7 is merely exemplary of possible conversational tracking devices. However, that diagram, and its method, are useful to come to an understanding of further methods of detecting doubletalk. As suggested above, an FIR echo canceller may have its coefficients updated through the use of half-duplex operation. There, convergence during doubletalk is avoided by zeroing out the microphone to line-out signal (having the same effect as turning off the microphone) while incoming audio is present. The microphone input is applied to coefficient adaptation when incoming audio is present at volumes sufficient for coefficient convergence. Although this method relies on the near-end participants remaining quiet while the far-end participants are speaking, this method works well because the near-end participants will usually realize that they are not being heard. After a period of time or as the coefficients are noted to be sufficiently stable, full-duplex operation may be commenced, enabling echo cancellation and the possibility of doubletalk.

Static Adaptation

In a constant-state environment, the coefficients, once established, would continue to work through the remainder of the connection. Therefore, the initial main effort is normally to establish a good set of coefficients as early as possible. For such a static environment, for example, a single person sitting in one position with his arms to his sides away from the speaker and microphone, the echo reflection paths in the environment are relatively constant and the coefficients would not need to be updated. However, people do shift and move about in the environment between the speaker and microphone, which introduces echo-cancellation errors into the system.

Many conferencing systems are configured to minimize this environmental echo path time variance. Room conferencing systems are often configured with speakers in the ceilings or walls, with microphones built into a table. Many automotive hands-free systems are configured similarly, utilizing the car's ordinary speakers and a microphone built into or attached to the dashboard. By separating speakers from microphones by such a distance, these environments usually have a direct air path from speaker to microphone and a large number of reflective paths, for example, off of walls. The movement of a person in that environment is likely only to affect a small minority of the echo paths present. Thus, in that configuration, the probability of a computationally substantial coefficient difference with the true echo paths in an environment is quite small. There, the echo canceller will typically work at not worse than a somewhat degraded performance, even if some variation in the environmental reflective paths occurs.

One method of doubletalk detection relies on that quality. In that method, a value representing the loss in transmission between the speaker(s) and the microphone is measured and or calculated. This "echo return loss," or ERL, in an ordinary conferencing system might be 6 dB to 12 dB. Referring back to FIG. 5, this ERL is calculated over time from levels read between incoming audio meter 405 and pre-EC meter 409, for example, by averaging to filter out instantaneous errors.

A second value is calculated representing the effective echo cancellation, or the signal loss between pre-EC meter 409 and post-EC meter 408, under conditions of far-end singletalk, called the "echo return loss enhancement," or ERLE. This value, again, can be calculated by the system by watching those meters at times when far-end singletalk is reliably detected. For a well-adapted filter, the loss may be 20 dB to 30 dB, depending on a number of factors, including the amount of noise in the system and environment.

Finally, a third value is computed through the course of the conversation, which is the "predicted post-EC level" (PPEL), which is the incoming reference signal minus the ERL and the ERLE. A comparison of this computed value against the post-echo cancelled level (at post-EC meter 408) indicates whether doubletalk is present. For example, in a well-adapted system, the ERL might be 6 dB and the ERLE might be 30 dB, with a predicted far-end singletalk loss (PPEL) of 36 dB. A threshold may be chosen, for example, half of that value (i.e., 18 dB), by which doubletalk is discriminated. Under far-end singletalk conditions with an incoming signal at a level of 0 dB, the post-EC level at meter 408 will be about the predicted value of −36 dB. If near-end audio is present at 0 dB, it will not be cancelled and the post-EC level will be read near 0 dB. Remembering from the discussion of FIG. 7 that the presence or absence of far-end audio is readily discernable, this method can detect doubletalk in some environments and avoid coefficient adaptation when it is present.

The method of doubletalk detection just described is a presumptive system, as it presumes that the filter coefficients are never so incoherent that corrective adaptation cannot occur. Thus, in the exemplary method just described, so long as changes to the environmental echo paths do not degrade the echo cancellation by more than about 18 dB, the system will continue to detect far-end singletalk and make appropriate corrective coefficient adaptation. Therefore, in a relatively stable echo-path environment a presumptive method may suffice.

In startup, the exemplary architecture operates initially in half-duplex mode until a sufficient quantity of far-end speech has been processed or until the FIR coefficients settle. In an exemplary product, coefficients settle after about 30 seconds of far-end speech. Once the coefficients have settled, a conferencing may enter full-duplex mode with good echo cancellation.

Push-to-Talk Microphone Systems

Figure 2A:
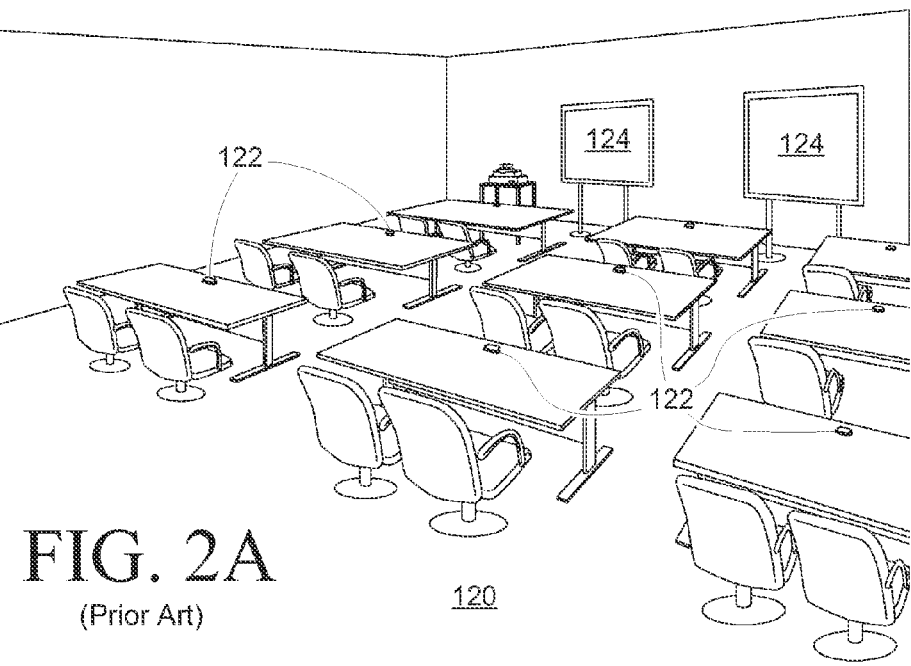
FIG. 2A shows components of a conferencing system installed to a classroom.
Figure 2B:
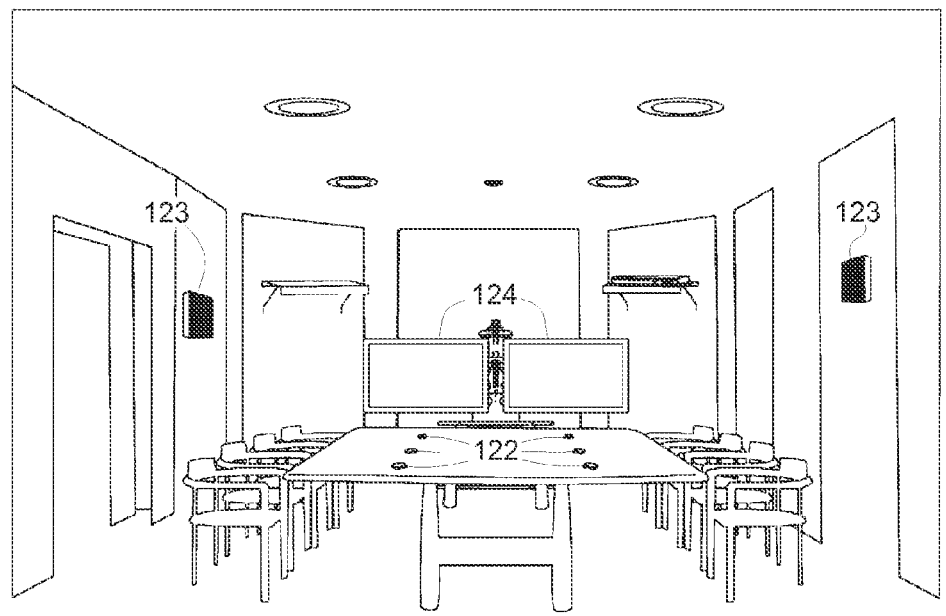
FIG. 2B shows components of a conferencing system installed to a boardroom.
Figure 2C:
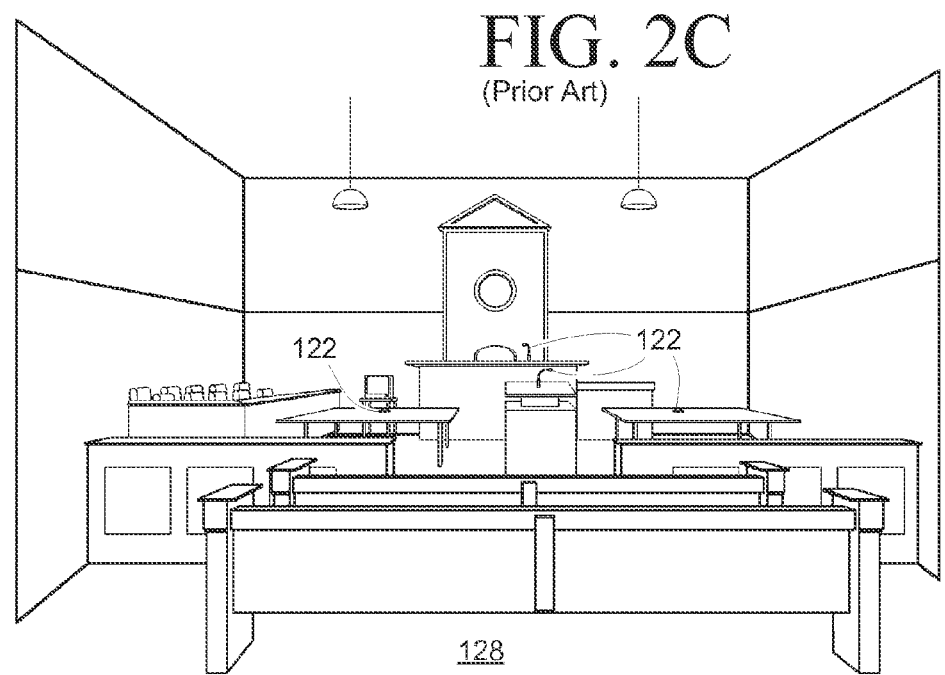
FIG. 2C shows components of a conferencing system installed to a courtroom.

The discussion thus far has mainly addressed the simple case of a system having only one static microphone. However, in an environment such as that shown in any of FIGS. 2A, 2B and 2C, it may be desirable to mute microphone inputs. In some systems, a mute function may be dependent on a voice activity detector (or VAD). In the simplest of these, a microphone is gated "on" where the volume of sound received at the microphone exceeds some threshold level. The turning on of a microphone is usually nearly instantaneous so the first part of a participant's speech is not clipped. The turning off of that microphone usually occurs by the volume remaining low for some period of time. Alternatively, a muting function can be implemented as a configuration element, such as an electronic button or software switch. For example, a conference may be moderated, and a person may control which microphones of a conferencing system are active at any time. Regardless of the muting function used, these types of systems typically rely on the continuous signal microphone type, i.e., a microphone that is always connected, controlled and muted by an independent signal.

Push-to-talk microphones have been used before in conferencing systems, however, the presence of this type of microphone complicates those implementing echo cancellation. Where a push-to-talk microphone is present, a conferencing system has no independent signal to determine the presence or absence of a microphone input. There are two consequences to this recognition failure. The first is incoherence of echo canceller coefficients. As a microphone input state is changed (from off to on and vice versa), a new echo characteristic is introduced into the system that the echo canceller is not matched for. Either the local acoustic echo will not be cancelled (microphone is turned on) or the system will inject a negative echo in the form of an echo cancellation signal (microphone is turned off).

Figure 6A:
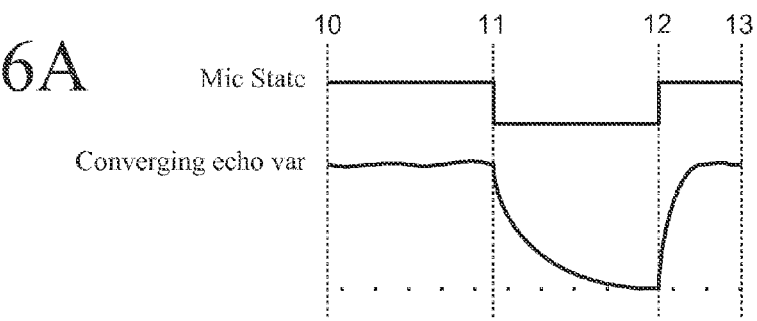
FIG. 6A conceptually shows the divergence of a converging echo canceller variable in the absence of a microphone signal.

The second of these consequences is best understood with reference to FIG. 6A, which, in a simplified fashion, shows the state of a microphone input "Mic State" and one or a set of echo canceller variables that is subject to convergence, such as echo cancellation coefficients "Converging echo var." At time 10, the microphone state is on, the converging echo variable has reached a steady state and the echo canceller is effectively cancelling echo. At time 11 the microphone state is switched to off. After this time 11, the variable converging function "notices" a lack of correlation between the signal being produced at the speaker(s) and the microphone input. As that correlation is zero, the converging variable drifts toward the dotted zero level, which is appropriate for a microphone that will remain off. However, in this example the microphone is turned on again at time 12. At that time 12, the converging variable has reached a level near zero, and consequently, echo is heard for the time required for that variable to re-converge. At time 13 the variable has again reached the appropriate steady-state value.

Figure 6B:
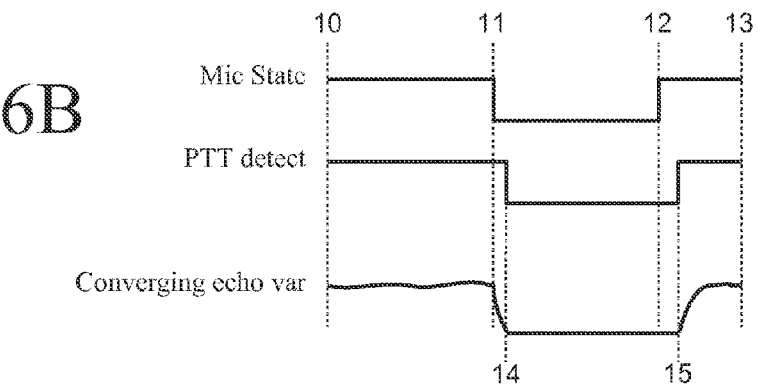
FIG. 6B conceptually illustrates mitigation against the divergence of a converging echo canceller variable in the absence of a microphone signal using a push-to-talk detector.

In contrast, a similar event is depicted in FIG. 6B, this time with a push-to-talk state detector "PTT detect." Again, at time 10 the converging variables have reached an appropriate steady-state value. Again, at time 11 the microphone state is switched to off. However, in this case, the push-to-talk detector determines that the microphone state is off at time 14 and, as a result, the drift of the converging variable is halted. The microphone is turned on again at time 12, and the push-to-talk detector detects this event at time 15. Note here that, when the microphone is turned on at time 12, the variable is closer to its steady-state value, which results in a reduction of erroneous echo cancellation effects. Additionally, the recovery of the steady-state value is more rapid because the converger is not starting from zero.

In some systems described herein that implement a push-to-talk detector, the echo cancellation variables and/or coefficients are not applied as to a microphone that has been detected to be muted. Thus, although the converging variables are frozen between times 14 and 15, the system may apply values of zero (for coefficients or at the output of the echo canceller), disable the echo canceller, or may otherwise recognize that no echo and/or feedback is introduced as to that muted push-to-talk microphone.

Figure 8:
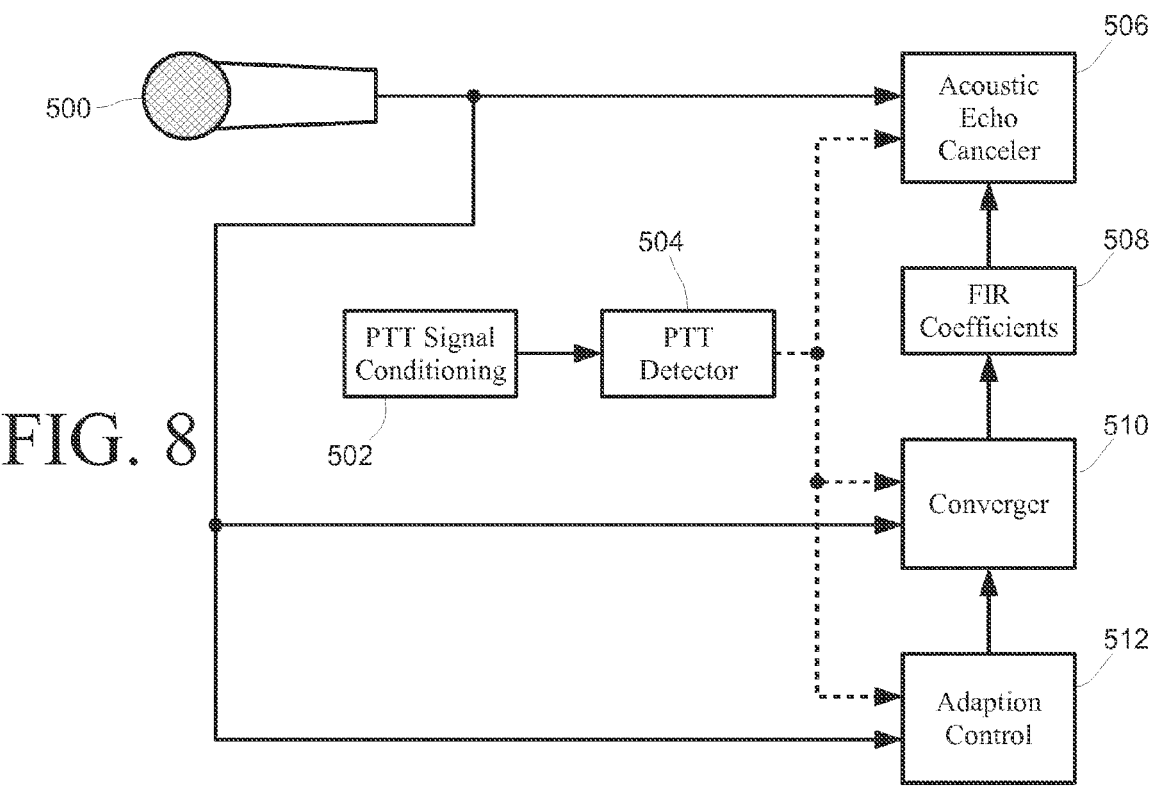
FIG. 8 conceptually shows the elements of one echo cancellation system that implements a push-to-talk detector and mitigation against divergence.

FIG. 8 depicts a system that implements push-to-talk microphone detection and countermeasures to avoid the divergence of echo cancellation coefficients and the erroneous application of echo cancellation. First, note that the common elements of an echo canceller are present, namely in acoustic echo canceller 506, supplied with FIR coefficients 508, which coefficients 508 are adapted by a convergence engine 510, which is enabled at various times by an adaption controller 512 that includes as one of its inputs a doubletalk detector. Note, however, that these particular elements of an echo canceller are not required, and the principles taught herein apply to any echo canceller that is susceptible to an unrecognized muting of a push-to-talk microphone. The audio signal received at microphone 500 is supplied to several elements, including controller 512 for the detection of local audio, convergence engine 510 for the determination of corrections to be made to coefficients 508, and to the acoustic echo canceller 506 for the removal of echo and/or feedback received at microphone 500.

Also in the system of FIG. 8, the microphone 500 audio signal is provided to a signal conditioner 502, which modifies that signal in ways that will become clear below. A push-to-talk detector 504 analyzes the conditioned signal produced by conditioner 502 and makes determinations as to whether a microphone 500 is a push-to-talk microphone that has been muted. Upon such a determination, a signal (shown in dotted lines) is sent throughout the echo cancellation system to apply modified operation. In this system, the acoustic echo canceller 506 is disabled, permitting the audio input from microphone 500 to pass through without the application of an echo cancellation signal. The operation of convergence engine 510 is disabled to avoid divergence of coefficients 508 and sustain them in their pre-muted levels. Also, doubletalk detector of controller 512 may contain variables that are better maintained through the period of muting, for example, the ERL and ERLE values described above.

Should push-to-talk detector 504 detect the un-muting of a microphone 500, a signal may be sent throughout the echo cancellation system to resume operation. Assuming that the detection of a live microphone 500 is correct, it is appropriate for acoustic echo canceller 506 to resume echo cancellation as the same echoes are likely to be exposed to the microphone 500 as before the muting. Convergence engine 510 may adapt the coefficients 508 to the new echo characteristics of the room, should it have changed. Under these conditions, doubletalk detector of controller 512 may properly operate with the presence of both a live microphone signal and an incoming signal potentially from a distant participant. Note, however, that in one implementation the convergence engine is not enabled for a environmental-settling period of time, for example, 1.0 second, to allow for a valid reading of the RMS input signal at the audio meters and to allow for the moving away of a hand on or near the microphone as it is turned on.

Detection of Push-to-Talk Microphones

Figure 4A:
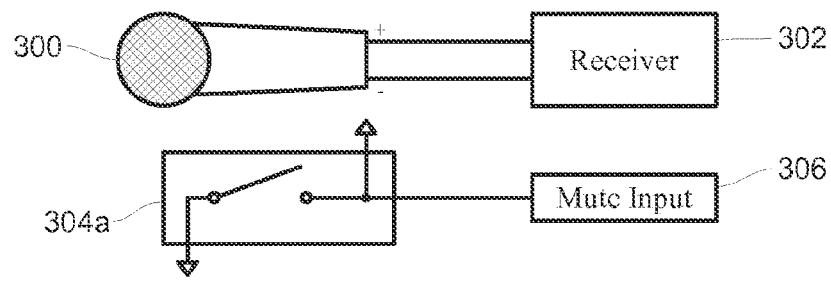
FIG. 4A conceptually shows the elements of a continuous signal microphone and mute control.
Figure 4B:
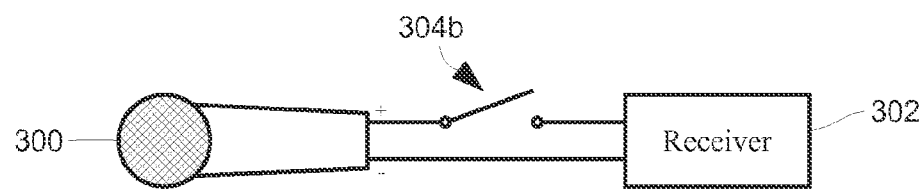
FIG. 4B conceptually shows the elements of one kind of push-to-talk microphone.

Several push-to-talk microphone detectors and methods of operation will now be described in reference to the particular microphone type shown in FIG. 4B. That kind of push-to-talk microphone is exemplified by a switch or gate 304b that interrupts the circuit between the microphone element 300 and receiver 302. Many microphones are characterized as voltage-type devices, which do not require large currents and are known as high-impedance devices. For ordinary microphones, the microphone element 300 is a high-impedance device, and receiver 302 is also a high-impedance device to match. Also characteristic of conferencing systems is a long cable between microphone element 300 (for example, located at a desk or podium) and an equipment chassis in which a receiver 302 is located (for example located behind a wall or in another room.)

Figure 9:
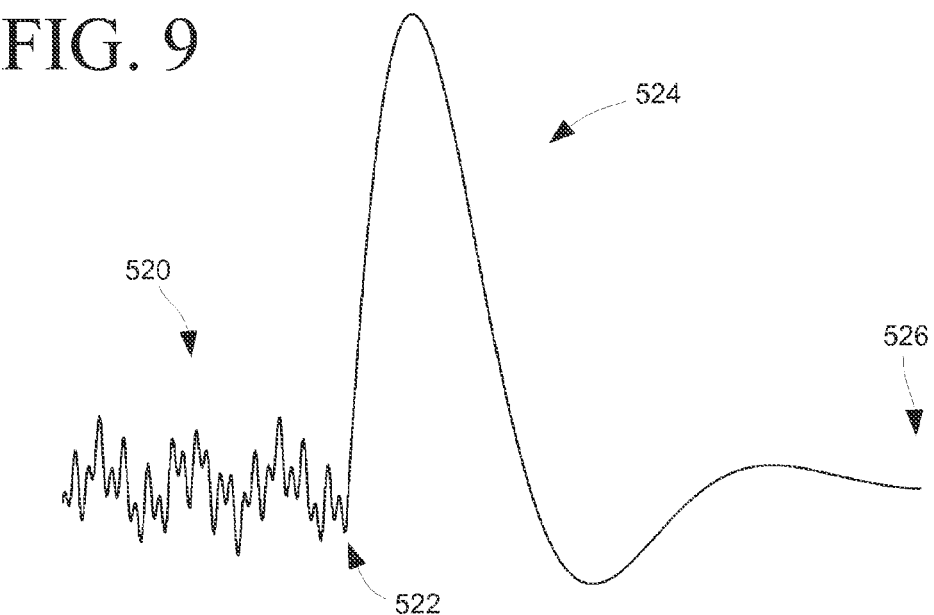
FIG. 9 depicts the waveform of a transient event associated with the muting of a common kind of push-to-talk microphone.

FIG. 9 is representative of a signal as seen by a receiver 302 on the disconnection or muting of such a microphone. This signal is characterized by the presence of an audio signal in region 520, a large low-frequency transient 524 beginning at the time of disconnection 522, which transient 524 dissipates to a zero level 526 over time. The transient 524 may occur for any number of reasons. For example, a transient may be a result of a high impedance of the receiver and a comparatively large capacitance of the cable, or where a push-to-talk microphone is provided power through a power filter and it is the power to the microphone that is switched. After disconnection of the microphone element, some residual current and/or voltage will be present in the cable or microphone electronics, providing for an LC-type waveform as shown in FIG. 9. It is to be noted, however, that other microphone types may not generate a transient signal; for example, an unpowered microphone connected by a short cord or a microphone that provides a digital signal where it is the digital signal that is interrupted.

Still looking at FIG. 9, it is possible to implement a push-to-talk detector using an amplitude detector as the transient 524 approaches the zero level 526. However, the instantaneous amplitude of a transient may exceed what an active microphone system may produce, with or without present participant speech, for a significant time, which may lead to divergence as suggested in the discussion of FIG. 6B. It is therefore desirable to minimize this time with a fast push-to-talk microphone detector.

Figure 10:
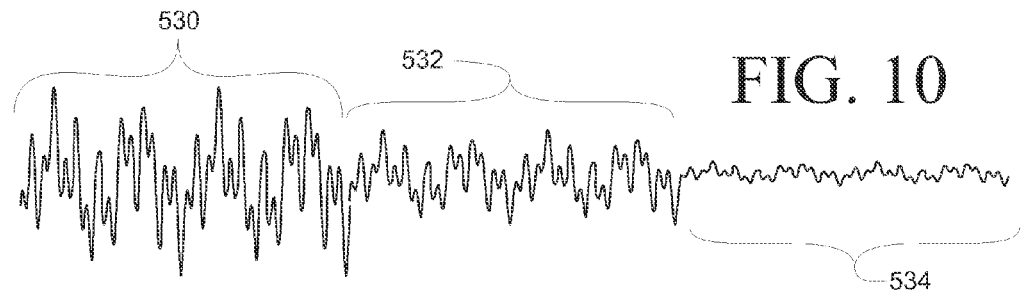
FIG. 10 depicts the waveform of audio processed by a transient-removing filter received from a microphone in active, quiet and muted states.
Figure 11A:
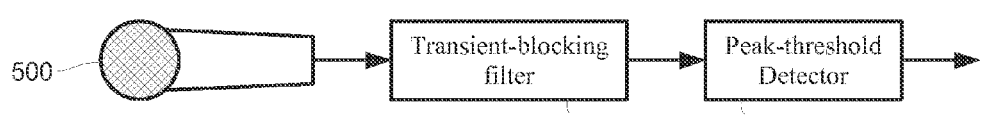
FIG. 11A conceptually shows the elements of a push-to-talk detector that includes a transient-blocking filter and a peak-threshold amplitude detector.
Figure 11B:
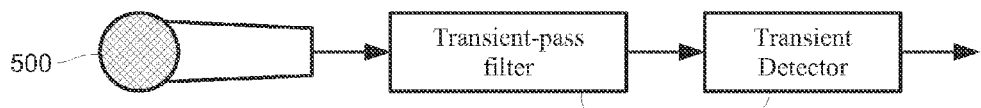
FIG. 11B conceptually shows the elements of a push-to-talk detector that includes a transient detector.
Figure 11C:
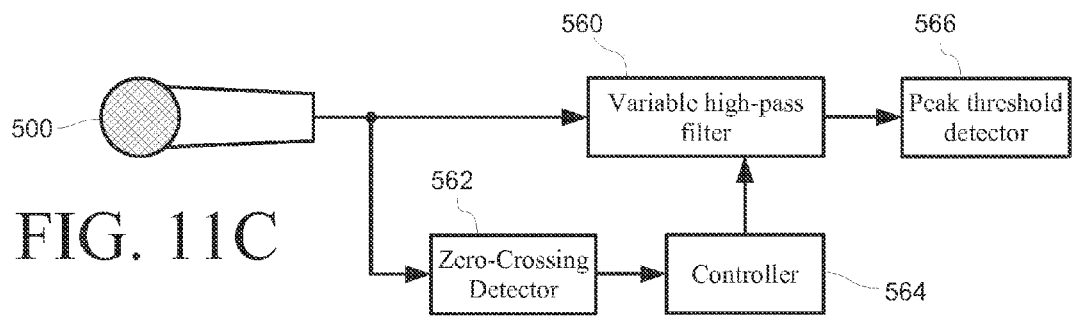
FIG. 11C conceptually shows the elements of a push-to-talk detector that incorporates a high-pass filter with a variable cutoff frequency, a zero-crossing transient detector and a peak-amplitude detector.

FIGS. 11A, 11B and 11C depict three types of fast push-to-talk detectors. The first of these, shown in FIG. 11A, operates on a simple theory of amplitude detection combined with a transient filter. That detector includes a peak-threshold detector 542 and a transient-blocking filter 540. For more accurate results, transient-blocking filter 540 may be a high-order high-pass filter of the fifth order or above. Filter 540 may be implemented as a high-pass filter that substantially filters out transient events such as transient 524 (FIG. 9). After such conditioning, a signal such as that shown in FIG. 10 is produced. That signal will include portions 530 that have a participant component, which will generally be the loudest portions. Other portions 532 will have little or no participant audio, and will represent the sum of the noise sources in the environments of the active microphone(s). For example, a speaker or an air-conditioning vent located in proximity to a microphone may produce a constant sound, or, alternatively, this noise may include intermittent sources, such as the movement of persons or objects within proximity to the microphone. Another portion 534 may be present in the signal upon the muting of microphones. In this portion the level is most quiet, including only noise sources within the receiving electronics with perhaps very weak audio due to parasitic capacitances in the microphone switch and/or electronics.

Figure 12:
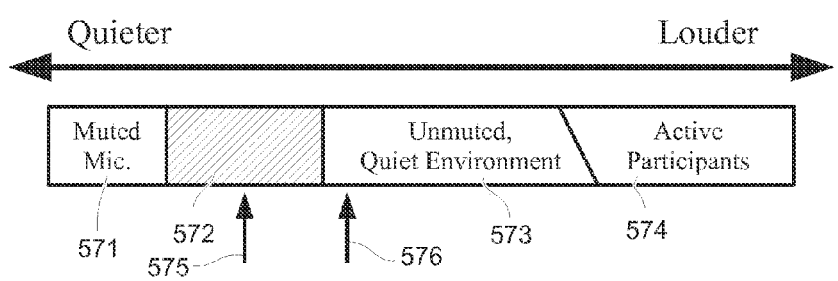
FIG. 12 illustrates the levels of audio that may be received from a push-to-talk microphone in a conference.

This property can be exploited to produce an effective push-to-talk microphone detector. To fashion such, an identification is made as to the volume levels indicative of the muted and non-muted portions. Referring now to FIG. 12, a scale is shown identifying several volume levels of the various conference states. On the loud end of the scale is a region 574 indicative of active conferee participation. As conferees remain silent, that region 574 blends into a scale of volume 573 indicative of un-muted microphones in a quiet environment, for which echo cancellation is still appropriate. A further region 571 indicates a volume of a muted or non-active microphone, where only electronic noises (for example amplifier, induced or quantization noises) are present. An intermediate region 572 may exist between the muted region 571 and non-muted regions 574, 573 that is unlikely to be seen for any substantial period, and probably only between transitions. A threshold 575 is chosen above the potential volumes of muted microphones within region 571 and preferably within region 572 under potential un-muted volumes within regions 573 and 574, on which a definitive determination can likely be made as to the state of any potential push-to-talk microphone.

This determination is preferably made with hysteresis or delay, i.e., with a test to see that the input of a microphone remains in the muted region for some period of time, thus filtering out spurious events. That delay time is preferably less than the time required for an echo to propagate in the environment of use(s), so that the echo cancellation system is shut off before it is deprived of data as input to convergent variable adaption. In one implementation, the meters measuring audio levels are peak meters, and the delay is equal to the time defined by the number of samples considered by a peak meter.

A turn-on threshold 576 differing from threshold 575 may also be selected to avoid bouncing between a muted and un-muted state. This turn-on threshold 576 is selected at a volume higher than turn-off threshold 575, and is preferably selected within the un-muted and quiet environment region 573 such that an active voice is required to enter an un-muted state, i.e., a positive indication. Hysteresis or delay may also be applied to the turn-on event, with a time period that is preferably of a very short duration to avoid clipping the speech of any participant speaking into the microphone. Adaption of variables may also be restrained during this period, or another period, to ensure the quality of input into an adaption engine. In the implementation including peak-type meters, this delay is effectively zero.

The thresholds 575 and 576 may be determined by manual observation, and may also be dynamically determined if desired. For example, the low-volume limit of the quiet environment 573 may be experientially determined on-the-fly by observing the volume levels present at the microphone when the doubletalk detector is in the no-conversation state 420 in FIG. 7. The thresholds 575 and 576 might then be adjusted accordingly. A dynamic determination might thus be made through system observation of noise floors in recognized system and/or conversational states.

The volume level detection at a microphone may be by a low-computational-requirements algorithm. For example, the present volume at a microphone may be computed by the peak-determining iterative equation $A_n = \text{MAX}(A_{n-1}D, |X_n|)$, where A is the amplitude/volume level, n is the present and n−1 represents the previous values, X is the stream of microphone samples normalized to 0, and D is a decay factor between 0 and 1 selected to smooth A but provide sufficient reactivity. Another useful peak-determining equation is $A_n = \text{MAX}(|X_1|, |X_2|, \ldots |X_n|)$, which is a simple peak-threshold meter/detector over n samples. In both of these equations it is assumed that X is reasonably well normalized to 0. Other possible equations might provide a different consideration of X over a period, apply a scaling function, consider the distance between positive and negative peaks, or other modifications so as to improve the accuracy or compatibility commensurate with a system architecture and desired performance.

The push-to-talk detector of FIG. 11A, using a peak-threshold detector 542, should be used with a transient-blocking filter 540, if transients are expected. The failure to utilize such a filter may result in late detection of a microphone-muting event and unwanted echo and coefficient divergence. A second type of push-to-talk detector, shown in FIG. 11B, utilizes a transient detector 552 optionally in combination with a transient-pass filter 550 that filters out frequencies uncharacteristic of transients. Transient detector 552 is keyed to detect the waveform of a transient event, such as that depicted in FIG. 9 as transient 524. Such a detector might be keyed to a particular amplitude and/or frequency characteristic of a disconnect, for example, in the LC environment of the combination of the cable and microphone receiver. It should be noted, however, that the microphone itself might contribute to the LC response if any significant conductive or capacitive paths are present in the microphone body. Therefore, the key of such a detector should not be made too selective if microphones of multiple types are to be used in conferencing system.

The two afore-described push-to-talk detectors are practical and may be used to avoid problems resulting from connected push-to-talk microphones. Recall, from FIG. 6B, that an early detection of a muting event (i.e., at time 14) minimizes the divergence of converging variables in the echo canceller. Thus, some significant time may be required for a peak-threshold detector to see a low-noise condition for any specified period of hysteresis or delay. Likewise, a transient detector may require some period to fingerprint the transient as being a muting event. An ideal muting-event detector would act instantaneously, so as to prevent any improper echo cancellation and divergence, and therefore determinations of microphone state are preferably rapid.

A third type of push-to-talk detector, depicted in FIG. 11C, attempts to limit this time of detection while at the same time providing accurate detection even in the presence of transients. A lowest frequency of interest is selected, which depends on the frequency response of the system, particularly in the locally received microphone audio. This lowest frequency of interest is selected below the low-frequency response limit of the microphone and its amplifiers and other components providing the sampled microphone signal. For example, in many telephonic systems a low-frequency limit of 50 Hz to 200 Hz will be used, under which limit, few audio components will be received. For an exemplary high-fidelity filter of this type, the lowest frequency of interest in the conferencing system is 20 Hz, corresponding to a zero crossing at least every 25 ms. During a transient event, the time between zero crossings may exceed this period. (Indeed, in one system a period of 70 ms was noted.) This exemplary push-to-talk detector includes a first- or second-order high-pass filter 560 whose cutoff frequency is adaptable. By utilizing a simplified filter with a variable cutoff frequency excess processing can be avoided. The cutoff frequency is controlled by a controller 564 which receives a signal from a zero-crossing detector 562. Controller 564 increases the cutoff frequency of filter 560 if after a certain interval a zero crossing is not detected. In the exemplary detector, this increase is gradual over a second period.

The output of filter 560 is fed to an amplitude detector 566, which in this example is a peak-threshold detector as described above. Referring back to FIG. 9, it can be seen that in the region 520 many zero crossings occur, and after a disconnect event 522 in region 524 the period of the transient determines that no zero crossing occurs for a substantial time. This detector recognizes that the region 520 may include mid- to low-frequency information that is important to determine the presence of a microphone signal, while in region 524 a detector that triggers on low frequency information may be detrimental. This detector therefore modifies filter 560 to pass less low-frequency information after a potential turn-off event 522, as indicated by the lack of zero crossings. The amplitude detector 566, although implemented simply, acts conceptually as a two-stage turn-off detector wherein transients assist, rather than hinder, the detection of turn-off events, permitting faster detection and less potential echo-cancellation coefficient drift.

FIG. 13 illustrates a method of implementing a push-to-talk detector using this property of certain transients that are zero-crossing sparse. Beginning with step 600, a new audio sample is collected. The method then proceeds to decision 602, in which a determination is made as to whether the new sample constitutes a new zero crossing. If yes, a timer is reset in step 612, the cutoff frequency of the high-pass filter is reset in step 614 and the method proceeds in step 610. If no, a zero crossing was not detected and a zero-crossing timer is incremented and compared against in decision 604 to see if 25 ms has elapsed since the previous zero crossing. If yes, the filter is adjusted upward toward its maximum frequency of about 1 kHz to 2 kHz in decision 606 and step 608. This frequency is selected to substantially remove the transient while passing any potential noise component through (recognizing that the noise will likely have a substantial portion of its power in the mid- to high-frequency spectrum). Again, this variable filter is preferably a low-complexity filter, and may be implemented using a transfer function of the first order. In this exemplary method, the cutoff frequency of this variable filter is gradually adjusted upward to its higher-frequency limit mainly to avoid non-triggering in the event that low-frequency audio is present during that time.

Following the performance of those steps, the high-pass filter is applied to the input sample in step 610. After that, the amplitude of the signal is determined over a window of samples, for example, using a peak-threshold detector. Again, the amplitude may be calculated using a method as described above, or another method that gives a reasonable approximation of the amplitude of the signal over the window. A comparison is made in decision 616 to see whether the audio level over that window exceeds the off threshold level. Note that this determination is made for each audio sample, regardless of the state of the high-pass cutoff. If the audio is above the threshold, a PTT timer is reset in step 617 to await a window of low-level audio detection. Now in decision 618, if the PTT timer meets or exceeds a certain detection time in which the audio amplitude remains lower than the off threshold, which in this example is 30 ms, the method determines that a push-to-talk microphone has turned off in step 620. The system may then halt the convergence of the echo cancellation coefficients and/or freeze all or part of the echo cancellation state, as described above. To avoid the problem with bounce described above with reference to FIG. 12, the threshold for decision 616 is raised in step 622, in this example by 12 dB. If the PTT timer remains or becomes less than the detection time, then the method determines the microphone to be on in step 619 and resets the threshold back to the original value in step 621 for the next turn-off event.

It is to be recognized that this third method, or another method, may be combined with another push-to-talk method as a secondary backup, useful in the event that a different transient or no transient is experienced, which backup method could be one of the other methods described herein. The reader may further note that the method exemplified in FIG. 13 may be implemented with relatively simple components, i.e., a zero-crossing detector, timer, amplitude meter and first-order filter, which may not require significant computing resources. It may also be recognized that this third method has a well-defined and relatively short time of response, which in the example is 30 ms. (The first two exemplary methods may require a significantly longer time to detect a push-to-talk event; for example, a transient detector may require an examination of the signal over several hundred milliseconds to make an accurate determination, and a peak-threshold detector may require more time if there are high-frequency transient components.)

Exemplary Product

The exemplary product is a rack-mount product, the front and rear of which are depicted in FIGS. 14A and 14B, respectively. This product is one of several in its family, which are interconnectable to form a larger system as shown in FIG. 14C. Configuration of this product is by way of a USB port 702 and/or an ETHERNET® port 704 and a separate computer (not shown), using software supplied with the product. This product includes four microphone inputs 706, although other products in this family may connect to up to eight microphones. Line-out connections 708 provide for line-type connections to other audio equipment, such as recording or amplification devices, if desired. Binding posts 710 are provided in this product for the connection of a single speaker, if desired. Line-in connections 712 are likewise provided for input signals at line levels. Control bus connectors 714 provide connectivity between units in the product's family. This product also includes connections for a telephone line 716 and a telephone set 718, respectively, although other products in this family may not provide for telephone system connectivity.

Supported by the exemplary product is acoustic echo cancellation on each microphone with push-to-talk microphone detection and management using the algorithm depicted in FIG. 13. Products in this family also include background noise cancellation on each microphone input 706, and user-configurable filters and compression as sound enhancements. The exemplary product may be combined with other products of the same family, permitting the connection of up to 64 microphones and 16 standard telephone lines at a single site. In this way, mixing functions can be shared between units. Also in the exemplary product, front panel controls 720 provide for certain configuration, including the control of mute and gain for all input and output channels. Indicator lights 722 provide status indications of microphone and telephonic connections. A display 724 provides more detailed status of the operational state of the product. The product's mixing function is also programmable to avoid false activation of microphones, including adaptive ambient, first microphone priority and PA adaptive mode functions, which may operate over several interconnected products in this family.

Now it is to be recognized that the features described above in relation to conferencing products that include acoustic echo cancellation may be incorporated singly, or any number of these features may be incorporated into a single product, consistent with the principles and purposes disclosed herein. It is therefore to be recognized that the products described herein are merely exemplary and may be modified as taught herein and as will be understood by one of ordinary skill, and the inventions are not limited to the particular products, techniques and implementations described herein.

What is claimed:

1. A conferencing system with echo cancelling that detects muting and unmuting of push-to-talk (PTT) microphones, comprising:
    a receive port coupled to a speaker and to a source of distant audio that receives an incoming participant signal;
    a transmit port coupled to a distant listener of local audio that provides an outgoing participant signal;
    a PTT microphone coupled to a microphone port to receive microphone audio;
    electronics operable to provide said incoming participant signal as audio by way of said speaker, said electronics being further operable to receive microphone audio from said PTT microphone and to transmit microphone audio through said transmit port;
    an acoustic echo canceller having a set of converging variables, said echo canceller receiving as an input said incoming participant signal, said echo canceller being operable to provide echo cancellation for said PTT microphone to said outgoing participant signal only if a PTT detector does not indicate the muting of said PTT microphone;
    wherein said PTT detector detects the muting and unmuting of said PTT microphone, said PTT detector provides an indication to said echo canceller that an echo signal is no longer being received at said PTT microphone, and said PTT detector further includes an amplitude detector, a transient filter, and a zero-crossing detector;
    wherein said PTT detector considers an amplitude of a first set of frequencies under active microphone conditions and another set of frequencies at a period of time following detection of a transient event;
    wherein said zero-crossing detector determines said transient event using as a condition that a zero-crossing event was not detected in the microphone audio for a time greater than a period of a low-frequency limit;
    wherein said echo canceller is configured to receive said indication from said PTT detector, and further wherein said echo canceller is configured to halt convergence of said converging variables on condition that said indication is being received; and
    wherein detection of a muting event is dependent on a determination by said amplitude detector that a volume level of said microphone audio is less than a preselected threshold.

2. The system of claim 1, wherein said PTT detector includes a high-pass filter having an adjustable cutoff frequency and receives the microphone audio as an input, wherein said amplitude detector considers an amplitude of an output of said filter, and wherein the consideration of the first from the another set of frequencies is made by adjustment of the cutoff frequency.

3. The system of claim 1, wherein said preselected threshold is selected from the set of values below amplitudes characteristic of a quiet environment exposed to an active microphone.

4. The system of claim 2, wherein the adjustment of the cutoff frequency is continuous over a period of time.

5. The system of claim 1, wherein said PTT detector is configured to transition between an indication of a muted microphone to a non-muted microphone under a condition that an amplitude of a signal received from said PTT microphone remains above a selected turn-on threshold for a selected period of time.

6. A method to manufacture a conferencing system with echo cancelling that detects muting and unmuting of push-to-talk (PTT) microphones, comprising:
   coupling a receive port to a speaker and to a source of distant audio that receives an incoming participant signal;
   coupling a transmit port to a distant listener of local audio that provides an outgoing participant signal;
   coupling a PTT microphone to a microphone port to receive microphone audio;
   providing electronics operable to provide said incoming participant signal as audio by way of said speaker, said electronics being further operable to receive microphone audio from said PTT microphone and to transmit microphone audio through said transmit port;
   providing an acoustic echo canceller having a set of converging variables, said echo canceller receiving as an input said incoming participant signal, said echo canceller being operable to provide echo cancellation for said PTT microphone to said outgoing participant signal only if a PTT detector does not indicate the muting of said PTT microphone;
   wherein said PTT detector detects the muting and unmuting of said PTT microphone, said PTT detector provides an indication to said echo canceller that an echo signal is no longer being received at said PTT microphone, and said PTT detector further includes an amplitude detector, a transient filter, and a zero-crossing detector;
   wherein said PTT detector considers an amplitude of a first set of frequencies under active microphone conditions and another set of frequencies at a period of time following detection of a transient event;
   wherein said zero-crossing detector determines said transient event using as a condition that a zero-crossing event was not detected in the microphone audio for a time greater than a period of a low-frequency limit;
   wherein said echo canceller is configured to receive said indication from said PTT detector, and further wherein said echo canceller is configured to halt convergence of said converging variables on condition that said indication is being received; and
   wherein detection of a muting event is dependent on a determination by said amplitude detector that a volume level of said microphone audio is less than a preselected threshold.

7. The method of claim 6, wherein said PTT detector includes a high-pass filter having an adjustable cutoff frequency and receives the microphone audio as an input, wherein said amplitude detector considers an amplitude of an output of said filter, and wherein the consideration of the first from the another set of frequencies is made by adjustment of the cutoff frequency.

8. The method of claim 6, wherein said preselected threshold is selected from the set of values below amplitudes characteristic of a quiet environment exposed to an active microphone.

9. The method of claim 7, wherein the adjustment of the cutoff frequency is continuous over a period of time.

10. The method of claim 6, wherein said PTT detector is configured to transition between an indication of a muted microphone to a non-muted microphone under a condition that an amplitude of a signal received from said PTT microphone remains above a selected turn-on threshold for a selected period of time.

11. A method to use a conferencing system with echo cancelling that detects muting and unmuting of push-to-talk (PTT) microphones, comprising:
   receiving an incoming participant signal with a receive port coupled to a speaker and to the source of distant audio;
   providing an outgoing participant signal with a transmit port coupled to a distant listener of local audio;
   receiving microphone audio with a PTT microphone coupled to a microphone port;
   providing electronics operable to provide said incoming participant signal as audio by way of said speaker, said electronics being further operable to receive microphone audio from said PTT microphone and to transmit microphone audio through said transmit port;
   providing an acoustic echo canceller having a set of converging variables, said echo canceller receiving as an input said incoming participant signal, said echo canceller being operable to provide echo cancellation for said PTT microphone to said outgoing participant signal only if a PTT detector does not indicate the muting of said PTT microphone;
   wherein said PTT detector detects the muting and unmuting of said PTT microphone, said PTT detector provides an indication to said echo canceller that an echo signal is no longer being received at said PTT microphone, and said PTT detector further includes an amplitude detector, a transient filter, and a zero-crossing detector;
   wherein said PTT detector considers an amplitude of a first set of frequencies under active microphone conditions and another set of frequencies at a period of time following detection of a transient event;
   wherein said zero-crossing detector determines said transient event using as a condition that a zero-crossing event was not detected in the microphone audio for a time greater than period of a low-frequency limit;
   wherein said echo canceller is configured to receive said indication from said PTT detector, and further wherein said echo canceller is configured to halt convergence of said converging variables on condition that said indication is being received; and
   wherein detection of a muting event is dependent on a determination by said amplitude detector that a volume level of said microphone audio is less than a preselected threshold.

12. The method of claim 11, wherein said PTT detector includes a high-pass filter having an adjustable cutoff frequency and receives the microphone audio as an input, wherein said amplitude detector considers an amplitude o an output of said filter, and wherein the consideration of the first from the another set of frequencies is made by adjustment of the cutoff frequency.

13. The method of claim 11, wherein said preselected threshold is selected from the set of values below amplitudes characteristic of a quiet environment exposed to an active microphone.

14. The method of claim 12, wherein the adjustment of the cutoff frequency is continuous over a period of time.

15. The method of claim 11, wherein said PTT detector is configured to transition between an indication of a muted microphone to a non-muted microphone under a condition that an amplitude of a signal received from said PTT microphone remains above a selected turn-on threshold for a selected period of time.

* * * * *